US005686371A

United States Patent [19]

Ansell et al.

[11] Patent Number: 5,686,371
[45] Date of Patent: Nov. 11, 1997

[54] CONJUGATED DIENE POLYMERISATION

[75] Inventors: Peter John Ansell, Stirling; Hugh David Williams, Denny, both of United Kingdom

[73] Assignee: Enichem Elastomers Ltd., Southampton, United Kingdom

[21] Appl. No.: 193,064

[22] PCT Filed: Sep. 9, 1992

[86] PCT No.: PCT/GB92/01645

§ 371 Date: Aug. 10, 1994

§ 102(e) Date: Aug. 10, 1994

[87] PCT Pub. No.: WO93/05083

PCT Pub. Date: Mar. 18, 1993

[30] Foreign Application Priority Data

Sep. 9, 1991 [GB] United Kingdom ............. 9119234

[51] Int. Cl.$^6$ .............................. B01J 31/00; C08F 4/44; C08F 4/02; C07C 2/02

[52] U.S. Cl. .................... 502/102; 502/119; 502/150; 502/152; 502/154; 502/158; 526/127; 526/128; 585/502; 585/506; 585/507; 585/530; 585/532

[58] Field of Search ........................ 585/502, 506, 585/507, 530, 531, 532; 502/102, 150, 152, 154, 158; 526/335, 340.4, 127, 128

[56] References Cited

U.S. PATENT DOCUMENTS 3,794,604  2/1974  Throckmorton et al. .
4,242,232 12/1980  Sylvester et al. ................. 502/102
4,461,883  7/1984  Takeuchi et al. ................. 502/102
5,286,694  2/1994  Pettijohn et al. ................. 502/102

OTHER PUBLICATIONS

L. Gargani, et al., "Rare Earth Catalysts for High Cis Polybutadiene", Proceedings Int. Rubber Conference, Paper 1–14, Jun. 1982, pp. 1–4.

"Elastomers and Rubber Elasticity", Synthetic Aspects of Crystallizable Elastomers, Bruzzone, Ch. 2., A.C.S. Symposium Series No. 193, 1982. no month available.

"Rare Earth Catalysts for High Cis Polybutadiene", Paper 1–14, Proceedings Int. Rubber Conf., Paris 1982. no month available.

Chemical Abstracts, vol. 109, No. 4, 1988 Abstract No. 24077A. no month available.

Primary Examiner—Glenn A. Caldarola
Assistant Examiner—J. Pasterczyk
Attorney, Agent, or Firm—Foley and Lardner

[57]  ABSTRACT

A process for the polymerization of one or more conjugated dienes by means of a rare earth based catalyst in which the catalyst is formed by bringing together in liquid hydrocarbon medium in the presence of a small portion of conjugated diene: a) a rare earth salt, b) an organo aluminum and c) a silicon halide or organosilicon halide and aging the catalyst before contact with the conjugated diene(s) to be polymerized. This catalyst formation procedure offers the possibility of producing a diene polymer of high cis content with a narrower molecular weight distribution and/or smaller high molecular weight fraction which is reflected in improved processing characteristics and reduced viscosity in styrene.

22 Claims, No Drawings

CONJUGATED DIENE POLYMERISATION

This application is a 371 of PCT/GB92/01645 filed on Sep. 9, 1992.

This invention relates to the polymerisation of one or more conjugated dienes. In particular, it relates to a process for the polymerisation of one or more conjugated dienes carried out using a rare earth based catalyst to give a polymer containing high contents of cis isomer, for example 93% or more, preferably 97% or more.

Several catalyst systems are known to cause the polymerisation of one or more conjugated dienes to give a polymer containing high contents of cis isomer. For many years such systems were based on a transition metal compound such as a titanium, cobalt or nickel compound. More recently, catalyst systems have been devised based on a compound of a so-called rare earth (lanthanide) element, i.e. an element having an atomic number of 57 (lanthanum) to 71 (lutetium), which give diene polymers with a very high cis content. The development of rare earth based polymerisation catalysts is reviewed, for example, in Bruzzone, M. "Elastomers and Rubber Elasticity", Ch. 2., A.C.S. Symposium Series No. 193, 1982 and Gargani L. et al "Rare Earth Catalysts for High Cis Polybutadiene" Paper I-14 Proceedings Int. Rubber Conf. Paris 1982. For reasons of activity, compounds of cerium, lanthanum, praseodymium, neodymium or gadolinium are preferred. A particularly preferred catalyst is formed from (a) a rare earth salt (e.g. a neodymium salt), preferably hydrocarbon soluble, (b) an organo aluminium cocatalyst and (c) a source of halogen.

Although rare earth based catalysts give the desired very high cis polydienes, one problem with such catalysts is the difficulty of controlling the molecular weight (Mw and Mn) and/or the molecular weight distribution (Mw/Mn) of the diene polymer product, particularly in a continuous polymerisation system.

The molecular weight and molecular weight distribution of diene polymers are important characteristics since they affect the processing characteristics of the diene polymer, such as the processability and carbon black incorporation time, the physical properties of the cured polymer and also the solution viscosity of the raw polymer in styrene, which is of great importance in the production of high impact polystyrene. Broad molecular weight distribution is characteristic of the majority of olefinic and diene polymers prepared with Ziegler type catalysts. Typical values range from about 3 to more than 10 and seem to be largely independent of the transition metal/rare earth compound used in the catalyst. In rare earth based catalysts, some control can be exercised over polymer molecular weight by, for example, varying the aluminium to rare earth ratio in the catalyst, and/or controlling the catalyst level and/or the degree of conversion. However, as with most Ziegler type catalysts, molecular weight distribution is generally much more difficult to control.

The difficulty in controlling the molecular weight of diene polymers prepared with rare earth type catalysts is referred to in U.S. Pat. No. 4,663,405 (Goodyear Tire/EniChem Polimeri) which describes and claims the use of vinyl halides as molecular weight regulators for polymerisations which are catalysed with lanthanide and actinide catalyst systems. However vinyl halides also affect molecular weight distribution, in many cases broadening it (see Tables III, IV and VI of this U.S. patent), whereas a narrow molecular weight distribution is desirable for many applications.

We have now found a method of preparing a rare earth catalyst which, when used in the polymerisation of conjugated dienes, offers the possibility of producing a diene polymer of narrower molecular weight distribution and/or smaller high molecular weight fractions.

According to the present invention a process for the polymerisation of one or more conjugated dienes by means of a catalyst comprising a rare earth salt, an organo aluminium cocatalyst and a source of halogen is characterised in that the catalyst is formed by bringing together in liquid hydrocarbon medium in the presence of a small portion of at least one conjugated diene a) a rare earth salt b) an organo aluminium compound and c) a silicon halide or organosilicon halide and aging the catalyst before contacting with the conjugated diene(s) to be polymerised.

Both formation of the catalyst in the presence of conjugated diene and use of a silicon halide as component (c), are essential to obtain products of narrower molecular weight distribution and/or smaller high molecular weight fractions whilst retaining the desired very high cis content and the catalyst activity.

In a preferred embodiment of the invention, the catalyst is prepared in liquid hydrocarbon medium by contacting a rare earth salt and an organo aluminium compound then adding a small portion of at least one conjugated diene and a silicon halide or organo silicon halide and aging before use. Preferably all three catalyst components are soluble in the liquid hydrocarbon medium.

The rare earth salt, component a), used in the catalyst is preferably a hydrocarbon soluble salt of a rare earth element. As mentioned above, preferred rare earth elements are cerium, lanthanum, praseodymium, gadolinium and neodymium which is especially preferred. Examples of hydrocarbon soluble salts are the neodymium carboxylates especially neodymium neodecanoate, neodymium naphthenate, neodymium octanoate, neodymium 2,2-diethyl hexanoate, neodymium 2,2-diethyl heptanoate and corresponding salts of lanthanum or praseodymium. Neodymium neodecanoate gives particularly good results.

Examples of organo aluminium compounds used as component b) of the catalyst are aluminium alkyls or aluminium alkyl hydrides having alkyl groups with 1 to 10 carbon atoms. Particularly preferred are aluminium triethyl, aluminium triisobutyl and diisobutyl aluminium hydride.

The diene(s) used in the catalyst formation is/are conveniently the same conjugated diene, or one of the conjugated dienes, which is/are to be polymerised in the polymerisation stage. Thus in a butadiene homopolymerisation the diene used in the catalyst formation is preferably butadiene but another diene, such as isoprene, piperylene 1,2 or 2,3 dimethyl butadiene, myrcene, 1,3 or 1,5 cyclooctadiene or 2-phenyl butadiene may be used.

Examples of silicon halides or organo silicon halides used as component c) of the catalyst are silicon tetrachloride, silicon tetrabromide, trimethyl silyl chloride, trimethyl silyl bromide, dimethyl dichlorosilane, diphenyl dichlorosilane and methyl trichlorosilane. Silicon tetrachloride is preferred.

The liquid hydrocarbon medium used to prepare the catalyst may be aliphatic, cycloaliphatic or aromatic. Examples are hexane, cyclohexane and toluene. Aliphatic or cycloaliphatic hydrocarbons are preferred.

The amount of each catalyst component and the conjugated diene used is such that the mole ratios are preferably:

Aluminium compound: rare earth salt: 1:1 to 200:1, more preferably 5:1 to 50:1

Halide in the silicon compound: rare earth salt: 0.5:1 to 15:1 more preferably 1:1 to 10:1

Conjugated diene: rare earth salt: 5:1 to 50:1 more preferably 5:1 to 40:1

Mole ratios of 15:1:35:3 (Al:Nd:Bd:Cl) are particularly preferred but the invention is not confined to these particular figures.

The catalyst formation is preferably carried out by contacting the components at a temperature of 0° to 30° C. The preferred procedure is to add the aluminium compound (component b) to the liquid hydrocarbon medium, followed by the rare earth salt (component a) and then to distil in the conjugated diene used in the catalyst formation and finally to add the silicon compound (component c) or to put the diene in the hydrocarbon medium first followed by the catalyst components in the same order. However other orders of addition may be used but may not give the same results.

In the catalyst formation, the components are preferably added to the hydrocarbon medium in succession with at least a short delay, e.g. a few minutes or more between each addition.

After formation, the catalyst mixture is aged before contact with the conjugated diene(s) to be polymerised. The aging period may be a few minutes up to several days, for example 5 minutes, 24 hours or 6 days, preferably at ambient temperature or below. Preferably the catalyst is aged for a minimum of several hours, more preferably at least 5 hours. The aging temperature is e.g. 0° C. to 30° C., ambient temperature (about 20° C.) being both convenient and effective.

After aging, the catalyst mixture is contacted with the conjugated diene(s) to be polymerised. The polymerisation is carried out by dissolving the diene(s) in hydrocarbon solvent, preferably the same solvent as used in the catalyst preparation stage. The solvent assists removal of the heat of polymerisation and keeps the viscosity of the polymerisation mixture within manageable limits. However using special reactor designs it is possible to polymerise the conjugated diene(s) in the absence or substantial absence of hydrocarbon solvent, i.e. as a bulk polymerisation. The amount of catalytic mixture used is preferably such that the molar concentration of the rare earth salt (component a) is 0.08 to 0.3 mmole per 100 g of diene monomer. The optimum amount may vary depending upon the particular catalyst components used and the desired molecular weight.

Catalysts prepared using the process of the invention are particularly useful for the preparation of polybutadiene, polyisoprene and isoprene-butadiene copolymers. However, they may be used to prepare polymers of conjugated dienes in general, for example of butadiene, isoprene, piperylene, 1,3-hexadiene, 1,3-octadiene, 2-phenyl-1,3-butadiene and alkyl substituted compounds thereof.

One important application for polybutadiene is in the preparation of high impact polystyrene (HIPS). In commercial practice, solution polymerised low cis (e.g. 35%) polybutadiene prepared with a lithium catalyst or high cis (e.g. 96%) polybutadiene, prepared with a cobalt catalyst, is generally used. Very high cis polybutadienes prepared using a rare earth based catalyst would find general application in the preparation of HIPS but the solution viscosity in styrene is usually too high for commercial HIPS manufacture (e.g. 400–500 cps or higher for a 5% solution in styrene at 25° C. compared with 140 cps for a similar solution prepared using low cis polybutadiene). Surprisingly it has been found that polybutadiene, prepared by the process of the present invention, has very favourable molecular weight characteristics and gives a much reduced viscosity in styrene, e.g. 200 cps for a 5% solution at 25° C. for a polybutadiene of Mooney Viscosity 40. Moreover high impact polystyrene made with polybutadiene, prepared with a rare earth catalyst, has excellent physical characteristics.

Apart from use in the preparation of polybutadiene, conjugated diene polymers prepared by the process of the present invention may be used, for example, in the manufacture of tires, belting and other moulded or extruded rubber articles generally.

The invention is illustrated by the following Examples.

EXAMPLES 1–24

In these Examples catalyst samples were prepared at 20° C. from neodymium neodecanoate, diisobutyl aluminium hydride, a portion of butadiene and silicon tetrachloride such that the respective molar ratios were 15:1:35:3 (Al:Nd:M:Cl). The catalyst components were used as previously prepared solutions in hexane. The neodymium neodecanoate (versatare) solution (0.64 Molar), prepared from "Versatic 10" acid ("Versatic" is a Trade Mark of Shell Chemicals) and neodymium oxide, was added to the diisobutyl aluminium hydride solution (1.1 Molar) in hexane. Butadiene was distilled in and the mixture allowed to stand for 1 to 2 minutes. Silicon tetrachloride solution (~1 Molar) was added and samples of the catalyst then aged for different periods at 20° C. (5 minutes, 24 hours and 6 days).

The catalyst samples were tested in the polymerisation of butadiene. The polymerisations were carried out in 170 ml bottles at 60° C. using hexane as solvent and butadiene at 14 wt % at a catalyst level of 0.15 mmole Nd/100 g butadiene. In each case % conversion of monomer to polymer was determined after 10 minutes, 30 minutes, 60 minutes and 180 minutes. Samples of polymer obtained after 10 minutes and 180 minutes were analysed, after termination, to determine Mooney viscosity, number average, molecular weight (Mn), weight average molecular weight (Mw), cis content. For comparison, similar catalysts were prepared but omitting the butadiene in the catalyst formation stage.

The results of the polymerisations and the analyses carried out are given in Table 1 (5 minutes aging), Table II (24 hours aging) and Table III (6 days aging). From these it can be seen that the polymers prepared using the butadiene modified catalyst samples had narrower molecular weight distributions (lower MWD) than the polymers prepared using the control catalyst samples, formed in the absence of butadiene and a lower percentage of high molecular weight polymer (in excess of $1 \times 10^6$). In all cases the cis contents were 97% or more, increasing with aging time to 98% or more.

The effect of increasing the aging period at 20° C. to 24 hours using the butadiene modified catalyst can be seen by comparing Examples 5 to 8 (5 minutes aging) with Examples 13 to 16 (24 hours aging). In particular the conversion after 10 minutes polymerisation increased from 15.2% (Example 5) to 61.6% (Example 13) indicating extremely fast polymerisation and the measured molecular weight distributions (MWD) after 180 minutes polymerisation (Example 16) were very narrow with no indication of bimodality.

After aging for 6 days at 20° C. the control catalyst had precipitated and gave a product with a very broad MWD. On the other hand the butadiene modified catalyst solution was still clear and gave extremely fast polymerisation (Examples 21–24) combined with a further increase in Mw and Mn. However there was no indication of MWD broadening and the polymer products had very narrow molecular weight distributions (MWD=2.5).

TABLE 1

| Ex. No. | Time Mins. | Conv. % | ML | Mn ×10⁻³ | Mw ×10⁻³ | Mpeak(s) ×10⁻³ | MWD | % >1 × 10⁶ |
|---|---|---|---|---|---|---|---|---|

1) Aging period: 5 minutes a) Control catalyst

| 1 | 10 | 14.8 | | | | | | |
| 2 | 30 | 38.3 | | | | | | |
| 3 | 60 | 51.7 | | | | | | |
| 4 | 180 | 83.7 | 41.8 | 122 | 373 | 309 | 3.1 | 6.9 | b) Butadiene modified catalyst

| 5 | 10 | 15.2 | | | | | | |
| 6 | 30 | 27.5 | | | | | | |
| 7 | 60 | 38.5 | | | | | | |
| 8 | 180 | 57.7 | 17.9 | 76 | 228 | 213 | 3.0 | 2.2 |

TABLE 2

Aging period: 24 hours

| Ex. No. | Time Mins. | Conv. % | ML | Mn ×10⁻³ | Mw ×10⁻³ | Mpeak(s) ×10⁻³ | MWD | % >1 × 10⁶ |
|---|---|---|---|---|---|---|---|---| a) Control catalyst

| 9 | 10 | 10.9 | | | | | | |
| 10 | 30 | 70.0 | | 85 | 591 | 109 | 6.9 | 18.5 |
| 11 | 60 | 87.8 | | | | | | |
| 12 | 180 | 97.4 | 91.8 | 195 | 629 | 346 | 3.2 | 18.3 | b) Butadiene modified catalyst

| 13 | 10 | 61.6 | | 125 | 312 | 204 | 2.5 | 5.3 |
| 14 | 30 | 92.0 | | | | | | |
| 15 | 60 | 97.3 | | | | | | |
| 16 | 180 | 98.0 | 40.7 | 162 | 357 | 259 | 2.2 | 6.0 |

TABLE 3

Aging period: 6 days

| Ex. No. | Time Mins. | Conv. % | ML | Mn ×10⁻³ | Mw ×10⁻³ | Mpeak(s) ×10⁻³ | MWD | % >1 × 10⁶ |
|---|---|---|---|---|---|---|---|---| a) Control catalyst

| 17 | 10 | 9.0 | | 101 | 789 | 378 | 7.8 | 25.9 |
| 18 | 30 | 51.4 | | | | | | |
| 19 | 60 | 87.6 | | | | | | |
| 20 | 180 | 95.1 | >100 | 216 | 852 | 376 | 3.9 | 27.7 | b) Butadiene modified catalyst

| 21 | 10 | 79.2 | | 161 | 406 | 278 | 2.5 | 8.0 |
| 22 | 30 | 97.2 | | | | | | |
| 23 | 60 | 99.3 | | | | | | |
| 24 | 180 | 97.8 | 71.7 | 191 | 483 | 325 | 2.5 | 11.2 |

Key
ML = Mooney Viscosity (ML₁₊₄ 100° C.)
Mn, Mw, Mpeaks = number average M.Wt., weight average M.Wt and peak M.Wt.
MWD = Mw/Mn
%>1 × 10⁶ = percentage M.Wt. >10⁶
5% SV = solution viscosity in styrene at 20° C.
Samples of the polymers from Examples 4*, 8, 12*, 16 and 24 were dissolved in styrene and tested for solution viscosity (5% at 25° C.) and the results were:

| Ex. No. | Mooney Viscosity | Solution Viscosity (cP) |
|---|---|---|
| 4* | 41.8 | 256 |
| 8 | 17.9 | 92 |
| 12* | 91.8 | 1940 |
| 16 | 40.7 | 238 |
| 24 | 71.7 | 540 |

*indicates control examples.

EXAMPLE 25

The procedure of Examples 1–24 was repeated several times using silicon tetrabromide, trimethylsilylchloride, dichlorodimethylsilane, diphenyldichlorosilane and methyltrichlorosilane in place of the silicon tetrachloride. None of the substituted silicon chlorides was as effective as silicon tetrachloride under the conditions used but silicon tetrabromide gave substantially the same results as silicon tetrachloride.

EXAMPLE 26

The procedure of Examples 1–24 was repeated using two separate catalyst samples, one formed and aged for twenty hours at 0° C. and the second formed and aged for twenty hours at 20° C. The sample formed and aged at 0° C. gave a lower molecular weight product, noticeably narrower molecular weight distributions and smaller amounts of high molecular weight material under the polymerisation conditions used with slightly reduced catalyst activity.

EXAMPLE 27

Catalyst samples were formed as in Examples 1–24 using varying aging times at 20° C. of 5,10,30 & 60 minutes, 2 hours, 4 hours and 24 hours, and the percent conversion in each case plotted against aging times. The results obtained indicated that an aging time of at least 5 hours gave improved results under the polymerisation conditions used.

EXAMPLE 28

Catalyst samples were formed as in Examples 1–24 using different conjugated dienes in place of butadiene in the catalyst formation and aging times of 5 minutes and 24 hours at 20° C. The conjugated dienes examined were isoprene, 1,2-dimethylbutadiene, piperylene, myrcene, 1,3-cyclooctadiene and 1,5-cyclooctadiene. Under the polymerisation conditions used, results were substantially the same as with butadiene but the activity after aging for 24 hours tended to be lower, indicating that butadiene is the preferred diene to use in the catalyst formation stage.

EXAMPLE 29

A catalyst was formed as in Examples 1–24 using neodymium naphthenate as the neodymium salt and a temperature of 20° C. for the formation and aging (20 hours) step. The result indicated that, under the polymerisation conditions used, neodymium "versatate" gave superior results.

We claim:

1. A process for the catalytic polymerization of at least one conjugated diene by a catalyst comprising a rare earth salt, an organo aluminium cocatalyst and a source of halogen, said process comprising the steps of:
   (a) preparing said catalyst by bringing together, in a liquid hydrocarbon medium and in the presence of a portion of at least one conjugated diene (i) a rare earth salt, (ii) an organo aluminium compound and (iii) as the source of halogen, a silicon halide or organosilicon halide:

(b) aging said catalyst; and (c) polymerizing at least one conjugated diene in the presence of the catalyst of step (b).

2. The process as claimed in claim 1, wherein said silicon halide or organosilicon halide is selected from the group consisting of silicon tetrachloride, silicon tetrabromide, trimethyl silyl chloride, trimethyl silyl bromide, dimethyl dichlorosilane, diphenyl dichlorosilane and methyl trichlorosilane.

3. The process as claimed in claim 1, wherein the mole ratio of halide: rare earth salt is within the range of from 0.5:1 to 15:1.

4. The process as claimed in claim 3, wherein the mole ratio of halide: rare earth salt is within the range of from 1:1 to 10:1.

5. The process as claimed in claim 1, wherein the mole ratio of conjugated diene: rare earth salt in step (a) is within the range of 5:1 to 50:1.

6. The process as claimed in claim 1, wherein the mole ratio of conjugated diene: rare earth salt in step (a) is within the range of 5:1 to 40:1.

7. The process as claimed in claim 1, wherein said rare earth salt is a hydrocarbon soluble salt of a rare earth element selected from the group consisting of cerium, lanthanum, praseodymium, gadolinium and neodymium.

8. The process as claimed in claim 7, wherein said rare earth salt is selected from the group consisting of neodymium neodecanoate, neodymium naphthenate, neodymium octanoate, neodymium 2,2-diethyl hexanoate, neodymium 2,2-diethyl heptanoate, lanthanum neodecanoate, lanthanum naphthenate, lanthanum octanoate, lanthanum 2,2-diethyl hexanoate, lanthanum 2,2-diethyl heptanoate, praseodymium neodecanoate, praseodymium naphthenate, praseodymium octanoate, praseodymium 2,2-diethyl hexanoate and praseodymium 2,2-diethyl heptanoate.

9. The process as claimed in claim 1, wherein said organo aluminium compound is selected from the group consisting of aluminium triethyl, aluminium triisobutyl and diisobutyl aluminium hydride.

10. The process as claimed in claim 1, wherein said conjugated diene of step (a) is selected from the group consisting of butadiene, isoprene, piperylene, 1,2-dimethyl butadiene, 2,3-dimethyl butadiene, myrcene, 1,3-cyclooctadiene, and 2-phenyl butadiene.

11. The process as claimed in claim 1, wherein the mole ratio of aluminium compound: rare earth salt is within the range of from 1:1 to 200:1.

12. The process as claimed in claim 11, wherein the mole ratio of aluminium compound: rare earth salt is within the range of from 5:1 to 50:1.

13. A catalyst useful in the catalytic polymerization of at least one conjugated diene comprising a rare earth salt, an organo aluminium cocatalyst and a source of halogen, said catalyst being prepared by bringing together, in a liquid hydrocarbon medium and in the presence of a portion of at least one conjugated diene, (i) a rare earth salt, (ii) an organo aluminium compound and (iii) as the source of halogen, a silicon halide or organosilicon halide, and aging said catalyst.

14. The catalyst as claimed in claim 13, wherein said catalyst is prepared by a process comprising the steps of:

(a) adding said aluminium compound to a liquid hydrocarbon medium;

(b) adding said rare earth salt to the mixture of step (a):

(c) adding said conjugated diene;

(d) adding said silicon halide or organosilicon halide; and (e) aging said catalyst product of step (d).

15. The catalyst as claimed in claim 13, wherein said rare earth salt is selected from the group consisting of neodymium neodecanoate, neodymium naphthenate, neodymium octanoate, neodymium 2,2-diethyl hexanoate, neodymium 2,2-diethyl heptanoate, lanthanum neodecanoate, lanthanum naphthenate, lanthanum octanoate, lanthanum 2,2-diethyl hexanoate, lanthanum 2,2-diethyl heptanoate, praseodymium neodecanoate, praseodymium naphthenate, praseodymium octanoate, praseodymium 2,2-diethyl hexanoate and praseodymium 2,2-diethyl heptanoate.

16. The catalyst as claimed in claim 13, wherein said organo aluminium compound is selected from the group consisting of aluminium triethyl, aluminum triisobutyl and diisobutyl aluminium hydride.

17. The catalyst as claimed in claim 13, wherein said conjugated diene is selected from the group consisting of butadiene, isoprene, piperylene, 1,2-dimethyl butadiene, 2,3-dimethyl butadiene, myrcene, 1,3-cyclooctadiene, and 2-phenyl butadiene.

18. The catalyst as claimed in claim 13, wherein said catalyst is aged for a period of from 5 minutes to 6 days.

19. The catalyst as claimed in claim 18, wherein said catalyst is aged between 5 hours and 6 days.

20. The catalyst as claimed in claim 13, wherein said catalyst is formed and aged at 0° C. to 30° C.

21. The catalyst as claimed in claim 13, wherein said rare earth salt comprises neodymium neodecanoate, said organoaluminium compound comprises diisobutyl aluminum hydride and said source of halogen comprises silicon tetrachloride.

22. A process as claimed in claim 1 wherein after the catalyst is aged and prior to the polymerization of step (c), additional conjugated diene is added to the aged catalyst, which is then polymerized in step (c).

* * * * *